May 14, 1946.  E. B. LEAR ET AL  2,400,359
CLUTCH MECHANISM FOR SLUSHER HOISTS
Filed April 14, 1943
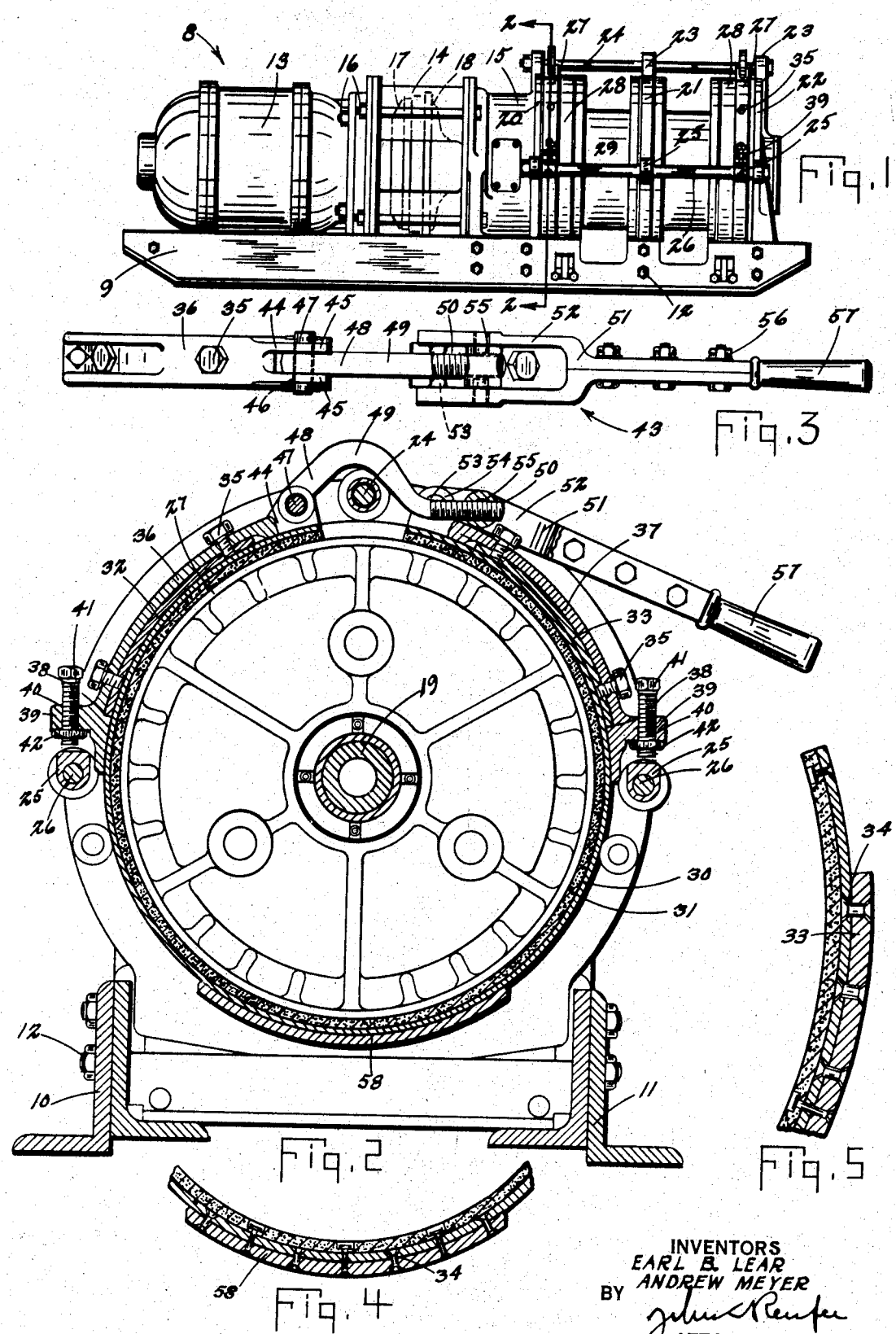
INVENTORS
EARL B. LEAR
ANDREW MEYER
BY
ATTORNEY Patented May 14, 1946

2,400,359

UNITED STATES PATENT OFFICE 2,400,359

CLUTCH MECHANISM FOR SLUSHER HOISTS

Earl B. Lear, Garfield Heights, and Andrew Meyer, Cleveland Heights, Ohio, assignors, by mesne assignments, to The Cleveland Pneumatic Tool Company, Cleveland, Ohio, a corporation of Ohio Application April 14, 1943, Serial No. 483,076

7 Claims. (Cl. 188—77)

The present invention relates broadly to slusher hoists, but more particularly to an improved mechanism for the clutch drum of such hoists.

An important object of the invention is to equip a slusher hoist with an improved clutch assembly that is simple in construction and effective in operation, and lends itself well to the automatic operation of the snubber in such a hoist.

Another object of the invention is to provide means in the form of a pair of concentric plates attached to the friction band forming part of the clutch mechanism to provide a base for attachment of the operating element.

A further object of the invention resides in the provision of means carried by the concentric plates for adjusting the friction band to compensate for wear, which means serves a further purpose in retaining the friction lining in engagement with the drum when the said band is in inoperative position.

A still further object of the invention is to provide members arranged in spaced relation on the outer face of the friction band for re-enforcing said band and thereby materially improving its efficiency in operation.

Other objects and advantages more or less ancillary to the foregoing reside in the specific construction and aggroupment of the elements peculiar to this structure, as will become apparent from a more complete examination of this specification.

In the drawing which illustrates the invention:

Fig. 1 is a side elevational view of a hoist embodying the invention.

Fig. 2 is an enlarged vertical sectional view taken substantially on line 2—2 of Fig. 1.

Fig. 3 is a top plan view of the friction band operating element shown detached from the drum.

Fig. 4 is a fragmentary sectional view illustrating the manner of attaching one of the concentric members to the friction band.

Fig. 5 is an enlarged fragmentary view illustrating the method of attaching the concentric member to which the clutch operating element is connected.

Referring to the drawing for a more detailed description thereof, and in which like numbers designate corresponding parts throughout the several views, the slusher hoist is generally designated by the reference numeral 8 and includes a base frame 9 consisting of a pair of parallel side members 10 and 11 preferably made of L-shaped angle iron and secured together by any suitable means such as cross bolts 12. Longitudinally mounted on the frame 9 is the hoist assembly 8 shown to include a motor 13, a hydraulic coupling housing 14 and a gear reduction casing 15 secured together by bolts 16. As is to be understood, the driving member 17 of the hydraulic coupling within the housing 14 is operatively connected to the motor 13, while the driven member 18 of the hydraulic coupling is mounted on a shaft, not shown, extending into the gear reduction casing 15. Projecting longitudinally away from the casing 15 there is a shaft 19, shown in Fig. 2, adequately journaled within spaced bearing supports 20, 21 and 22, the bearing support 20 being an integral part of the casing 15, while the support 22 forms the end of the hoist assembly shown in Fig. 1. Each of these supports is rigidly secured to the base frame 9 by the cross bolts 12, while the upper end of each support is provided with a lug 23 through which extends a longitudinally disposed tie rod 24. Each side of each support is further formed with lugs 25 through which extends a tie rod 26, the last mentioned tie rod having an additional function to be hereinafter more fully described.

Rotatably mounted on the shaft 19 adjacent each bearing support 20 and 22, there is a relatively narrow drum 27 operatively associated with a similar drum 28 which in turn is interconnected with the shaft 19 by any suitable gearing in a manner to drivingly rotate the drum 28 when the drum 27 is held against rotation, and allowing the drum 28 to either remain stationary or rotate freely when the drum 27 is free to rotate. Since the mechanism for drivingly interconnecting the drums 27 and 28 is well known in the art and forms no part of the present invention, it has not been deemed necessary to fully illustrate the same nor is a further explanation thought necessary. The drum 27 will hereinafter be referred to as the clutch drum while the drum 28 will be referred to as the brake drum. As is to be understood, the brake drum 28 is drivingly connected by any suitable means with a rope winding drum 29 and it will be further understood that when the clutch drum 27 is held against rotation both drums 28 and 29 are drivingly rotated in one or the other direction, and that when the clutch drum 27 is allowed to rotate the drums 28 and 29 either remain stationary or are free to rotate when, for instance, subjected to the pull of the rope wound around the drum 29.

Since the clutch drum 27 is constantly rotating and the drums 28 and 29 will preferably rotate upon arresting rotation of the drum 27, the present invention has been designed to effectively control the rotation of the drum 27 at all times. Referring more particularly to Fig. 2 of the drawing, the clutch assembly includes a band 30 partly surrounding the drum 27, the inner side of which is effectively lined with any suitable brake lining material 31 which engages the peripheral wall of the drum 27. Secured to the outer face of the band 30, there are a plurality of relatively short metallic members 32 and 33 which are disposed concentric to said band. The members 32 and 33 are attached to the band 30 by means of rivets or the like 34 as shown in Figs. 4 and 5 of the drawing, and are of substantially the same width as said bands. The concentric members 32 and 33 lend rigidity to the friction band as well as assisting in maintaining the same in operative engagement with the clutch drum.

The members 32 and 33 have attached thereto by means of machine screws or the like 35, relatively heavy plate-like members 36 and 37 which are also concentric with the friction band 30. The members 36 and 37 are disposed on the band 30 in such a manner that the upper ends of the members 32 and 33 are spaced from the upper ends of the members 36 and 37. The lower ends of the members 36 and 37 are formed with shoulder-like portions 38 against which the lower ends of the members 32 and 33 abut. Extending laterally from the lower end of each member 36 and 37 there is a portion 39 formed with a threaded opening 40 in which is positioned a threaded bolt 41 having a lock nut 42. The lower end of the bolt 41 is adapted to contact the tie rod 26 upon release of the clutch operating element as will hereinafter appear. In view of the fact that the ends of the friction band and lining are not connected together, some means must be provided for maintaining these members in concentric position on the drum when said drum is freely rotating at which time the clutch operating element is in inoperative position. When in this position, the clutch band 30 and its attached members will move away from the drum 27. However, detachment therefrom to an undesirable extent is prevented by the operating lever and link at the top, presently to be described, and by contact of the projecting ends of the bolts 41 with the tie rods 26.

The bolts 41 in conjunction with the tie rods 26 are also employed for adjusting the clutch band on the drum to compensate for wear. In this last mentioned function, when desiring to adjust the band to compensate for the wear of its lining, the threaded bolts 41 are turned outwardly through their openings and as contact is made with the tie rods 26, the clutch band and lining will be raised on the clutch drum and thus brought into closer engagement therewith.

The projecting portions 39 together with the bolts 41 form stops which are useful not only in the respects just mentioned, but also in connection with the automatic operation of a snubber band engaging the brake drum 28, as fully disclosed in the copending application of Andrew Meyer, Serial No. 497,425, filed August 5, 1943. This automatic operation of the snubber is dependent upon a short circumferential movement of the band 30 after it grips the drum 27. Assuming that the normal rotation of drum 27 is counterclockwise, as viewed in Fig. 2, then when the band 30 is contracted it will receive a counterclockwise impulse from the drum which will carry it along in that direction until the movement is terminated by stop 39, 41 engaging lug 25 at the left of the figure. This counterclockwise movement of the band 30 is employed, by means disclosed in the said application, for relieving a normal snubbing action upon the drum 28 and putting under stress the spring used for normally applying the snubber to its drum. When, however, the band is again released, that spring operates to again apply the snubber and to impart a clockwise movement to band 30, which movement continues until terminated by the engagement of the right hand bolt 41 with lug 25 on the right hand side of the hoist.

The concentric members 36 and 37 also form the means for attaching the friction band operating element generally designated by the reference numeral 43. The upper end of the member 36 is formed with a bifurcated jaw 44 providing a pair of spaced arms 45 having aligned openings 46 for receiving a pivot pin 47. One member 48 of the operating element 43 fits between the pair of arms 45 and has one end pivotally held therebetween by means of the pin 47. The intermediate portion of the member 48 is bent as indicated at 49 so as to be positioned over the tie rod 24 and its opposite end is threaded as indicated at 50. The other member 51 of the operating element 43 includes a U-shaped jaw 52 which is pivotally connected at 53 with a pair of upstanding ears 54 forming a part of the upper end of the concentric member 37. Positioned intermediate the ends of the U-shaped jaw 52, there is a roller 55 formed with a transversely extending threaded opening for receiving the threaded end 50 of the member 48. While the member 51 has been shown as formed of two parts united by means of bolts 56, it is to be understood that said member can be of integral construction, and in either event will be provided with a handle portion 57 by which the element is operated. In the position shown in Fig. 2 of the drawing, the lining 31 is pressed against the peripheral wall of the clutch drum 27 for checking rotation thereof. As is understood, the operator of the hoist must exert pressure downwardly on the handle portion 57 in order to prevent this rotation. When desiring to arrest rotation of the drums 29, the operator lifts the element upwardly by its handle portion 57 until the member 51 assumes a substantially vertical position at which time the projecting ends of the bolts 41 will contact the tie rod 26 to prevent further movement of the clutch band away from the drum or complete disengagement thereof.

As before indicated, in hoists of the character herein illustrated, the rope receiving drum is caused to rotate upon checking the rotation of its complementary clutch drum. In order to check the rotation of the clutch drum, pressure is exerted downwardly on the handle 57 and when this pressure is initially applied, the clutch drum tends to carry the entire friction band assembly during its rotary movement until one of the bolts 41 makes contact with its complementary tie rod 26. For example, and looking at Fig. 2, if the clutch drum 27 is rotating in a counterclockwise direction when checking rotation thereof through the handle 57, sufficient pressure cannot be exerted on said handle to completely arrest rotation of said drum and at the same time maintain the relative position of the clutch band and the drum. Consequently the entire friction band mechanism will rotate in unison with the drum until the threaded bolt 41 on the left-hand side of the drum makes contact with the tie rod 26. From that point on, a normal pressure on the handle will be sufficient to check further rotation of said drum.

Mounting the connecting plates 36 and 37 on the concentric plates 32 and 33 rather than directly to the clutch band 30, permits convenient assembly and disassembly when replacement of the friction band and/or lining is necessary. The operating element 43 is easily removed by loosening the machine screws 35 which will permit the plates 36 and 37 and their connected elements to be lifted from the clutch drum, after which it is merely necessary to slide the band 30 longitudinally over the hoist until free from the tie rods 26. This procedure is reversed when installing a new or relined band.

The plate member 58 which is preferably positioned on the bottom of the band 30, in addition to re-enforcing said band and making the same more rigid, will increase the efficiency of the clutch by reducing the effort necessary to actuate the clutch operating element 43. It has been found in actual practice that with the use of this member, considerably less force is required to be applied to the handle in order to overcome the horizontal pulling action of the rope on the winding drum. The concentric members 32, 33 and 58 and the connecting members 36 and 37 add rigidity to the friction band, and thereby materially increase the efficiency of the clutch.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

We claim:

1. A mechanism for hoists including a rotatable drum, a band partly surrounding said drum having ends movable toward each other for effecting a braking action of said band on said drum, concentric reinforcing members attached to said band and arranged in spaced relation thereon, connector plates overlying and disposed concentrically of certain of said reinforcing members, each end of said connector plates having a portion extending toward the periphery of said band providing a housing therebetween for said reinforcing members, and interengaging band operating elements carried by said connector plates.

2. A mechanism for hoists including a rotatable drum, a band partly surrounding said drum having ends movable toward each other for effecting a braking action of said band on said drum, connector plates mounted adjacent each end of said band and disposed concentrically thereof, each end of said connector plates having a portion extending toward and in contact with the periphery of the band, a lug on the lower end of each connector plate projecting laterally away from the band, means carried by said lugs for effecting adjustment of said band, and interengaging band operating elements carried by said connector plates.

3. A mechanism for hoists including a rotatable drum, a band partly surrounding said drum having ends movable toward each other for effecting a braking action of said band on said drum, concentric reinforcing members attached to said band and arranged in spaced relation thereon, connector plates overlying and disposed concentrically of certain of said reinforcing members, each end of said connector plates having a portion extending toward the periphery of said band providing a housing therebetween for said reinforcing members, a lug on the lower end of each connector plate projecting laterally away from the drum, means carried by said lugs for effecting adjustment of said band, and interengaging band operating elements carried by the upper end of said connector plates.

4. In mechanism of the character described, a frame having tie rods at its opposite sides, a rotatable drum mounted between said tie rods, a friction band partly surrounding said drum with its ends above and between said tie rods, said band when contracted being free to move with the drum through a small angle and when expanded being free to be moved independently of the drum in the opposite direction through a small angle, means carried exclusively by the band for contracting or expanding the band, a stop on the band adapted to limit circumferential movement of the band in one direction by contact with a tie rod, and a second stop on the band adapted to limit circumferential movement thereof in the opposite direction by contact with a tie rod.

5. In mechanism of the character described, a frame having tie rods at its opposite sides, a rotatable drum mounted between said tie rods, a friction band partly surrounding said drum with its ends above and between said tie rods, said band when contracted being free to move with the drum through a small angle and when expanded being free to be moved independently of the drum in the opposite direction through a small angle, means carried exclusively by the band for contracting or expanding the band, a stop on each of the opposite sides of the band above said tie rods, said stops being so located on the band that when the latter is contracted one only of said stops may engage a tie rod.

6. In mechanism of the character described, a frame having tie rods at its opposite sides, a rotatable drum mounted between said tie rods, a friction band partly surrounding said drum with its ends adjacent the top of the drum, means carried exclusively by the band for contracting or expanding the band, and laterally extending stops on the band adapted to engage said tie rods when the band is expanded.

7. In mechanism of the character described, a frame having tie rods at its opposite sides, a rotatable drum mounted between said tie rods, a friction band partly surrounding said drum with its ends adjacent the top of the drum, means carried exclusively by the band for contracting or expanding the band, and laterally extending stops on the band adapted to engage said tie rods when the band is expanded, said stops being adjustable in order to control the extent to which the band when expanded is permitted to fall away from the drum.

EARL B. LEAR.
ANDREW MEYER.